(12) United States Patent
Takeshita et al.

(10) Patent No.: US 8,232,023 B2
(45) Date of Patent: Jul. 31, 2012

(54) FUEL CELL AND METHOD OF MANUFACTURING SAME

(75) Inventors: Naohiro Takeshita, Susono (JP); Fumishige Shizuku, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 694 days.

(21) Appl. No.: 12/303,966

(22) PCT Filed: Jun. 6, 2007

(86) PCT No.: PCT/IB2007/001481
§ 371 (c)(1),
(2), (4) Date: Dec. 9, 2008

(87) PCT Pub. No.: WO2007/144717
PCT Pub. Date: Dec. 21, 2007

(65) Prior Publication Data
US 2010/0297533 A1 Nov. 25, 2010

(30) Foreign Application Priority Data
Jun. 9, 2006 (JP) .................................. 2006-161123

(51) Int. Cl.
*H01M 2/08* (2006.01)
(52) U.S. Cl. ........................................ 429/508; 429/512
(58) Field of Classification Search .................... 429/508
See application file for complete search history.

(56) References Cited

U.S. PATENT DOCUMENTS

| | | | | |
|---|---|---|---|---|
| 2003/0082430 | A1* | 5/2003 | Suzuki | 429/36 |
| 2004/0096730 | A1* | 5/2004 | Kuroki et al. | 429/44 |
| 2007/0003821 | A1 | 1/2007 | Belchuk | |
| 2007/0298290 | A1 | 12/2007 | Bekkedahl et al. | |

FOREIGN PATENT DOCUMENTS

| | | |
|---|---|---|
| EP | 1 612 877 | 1/2006 |
| EP | 1 624 515 | 2/2006 |
| JP | 11-135132 | 5/1999 |

(Continued)

OTHER PUBLICATIONS

Office Action issued Mar. 13, 2012, in Japanese Patent Applicaton No. 2006-161123, filed Jun. 9, 2006 (with partial English language translation).

*Primary Examiner* — Ula C Ruddock
*Assistant Examiner* — Jacob Marks
(74) *Attorney, Agent, or Firm* — Oblon, Spivak, McClelland, Maier & Neustadt, L.L.P.

(57) ABSTRACT

A fuel cell including a power generating body including an electrolyte layer and electrode layers, diffusion layers disposed on opposite major surfaces of the power generating body, separators disposed on major surfaces of the diffusion layers opposite to those facing the power generating body, a first seal formed around the periphery of the power generating body and including an effective seal portion that suppresses leakage of the gas to the outside of the fuel cell between the separators, and a second seal formed integrally with at least one of the diffusion layers to extend along an end face of the diffusion layer. The second seal is in intimate contact with a surface of the power generating body on which the diffusion layer is laminated and a surface of a corresponding one of the separators that is laminated on the diffusion layer.

5 Claims, 10 Drawing Sheets

FOREIGN PATENT DOCUMENTS

| | | |
|---|---|---|
| JP | 2001 155745 | 6/2001 |
| JP | 2001-510932 | 8/2001 |
| JP | 2002-25587 | 1/2002 |
| JP | 2002-42838 | 2/2002 |
| JP | 2002 231274 | 8/2002 |
| JP | 2003-31237 | 1/2003 |
| JP | 2004 119121 | 4/2004 |
| JP | 2005 285350 | 10/2005 |
| JP | 2005-347255 | 12/2005 |
| JP | 2006-114227 | 4/2006 |
| JP | 2007 12399 | 1/2007 |
| WO | 2004/102721 | 11/2004 |
| WO | 2006 040994 | 4/2006 |
| WO | 2007 105096 | 9/2007 |
| WO | 2007 110397 | 10/2007 |

* cited by examiner

FUEL CELL AND METHOD OF MANUFACTURING SAME

BACKGROUND OF THE INVENTION

1. Field of the Invention

The invention relates to a fuel cell and a method of manufacturing the fuel cell, and, in particular, to a fuel cell that is less likely to suffer from a reduction in its power generating capability, and a method of manufacturing such a fuel cell.

2. Description of the Related Art

In recent years, fuel cells operable to generate electric power utilizing electrochemical reactions between hydrogen and oxygen receive widespread attention. One example of fuel cells has a laminated structure consisting principally of a membrane electrode assembly (which will be called "MEA" when appropriate); diffusion layers and separators, in which the diffusion layers are disposed on opposite major surfaces of the MEA, and the separators are disposed on major surfaces of the diffusion layers opposite to their major surfaces facing the MEA. The MEA may be constructed such that a cathode electrode layer is disposed on one of the opposite surfaces of the electrolyte layer, and an anode electrode layer is disposed on the other surface of the electrolyte layer. The diffusion layers are formed of, for example, a porous material.

In operation, air containing oxygen and a fuel gas containing hydrogen are supplied to the diffusion layers of the fuel cell via the separators. The air and fuel gas supplied to the fuel cell may also be called "reaction gas". The reaction gas supplied to the diffusion layers of the fuel cell is then supplied to the MEA while flowing through the interior of the diffusion layers, so that the reaction gas is used for power generation in the MEA. Part of the reaction gas which was not used for power generation is discharged to the outside of the fuel cell via the diffusion layers and separators.

In order to prevent leakage of the reaction gas from the inside to the outside of the fuel cell, seal members may be provided which surround the peripheries of the MBA and diffusion layers, as disclosed in, for example, JP-A-2002-231274.

In the fuel cell as described above, the seal members and the diffusion layers are located with certain spacing provided therebetween, in order to prevent incomplete sealing and variations in the surface pressure due to interference between the seal members and the diffusion layers in the stacking direction of the fuel cell. As a result, some space is formed between the seal members and the diffusion layers. With this arrangement, part of the reaction gas supplied to the fuel cell may pass through the space, and may be discharged to the outside of the fuel cell without being used for power generation. If part of the reaction gas is discharged without being used for power generation, the power generating efficiency of the fuel cell may deteriorate.

SUMMARY OF THE INVENTION

The invention provides technologies for suppressing a reduction in the power generating efficiency of a fuel cell.

A first aspect of the invention relates to a fuel cell including: (a) a power generating body including an electrolyte layer and electrode layers disposed on opposite major surfaces of the electrolyte layer, (b) a plurality of diffusion layers disposed on opposite major surfaces of the power generating body, and having internal channels through which a gas used for power generation flows so that the gas is supplied to the power generating body, (c) a plurality of separators disposed on major surfaces of the diffusion layers opposite to major surfaces thereof facing the power generating body, so as to supply the gas to the diffusion layers, the power generating body, diffusion layers and the separators being stacked together to form the fuel cell, (d) a first seal formed around the periphery of the power generating body and having an effective seal portion that suppresses leakage of the gas to the outside of the fuel cell between the separators, and (e) a second seal formed integrally with at least one of the diffusion layers to extend along an end face of the diffusion layer, the second seal being in intimate contact with the a lamination surface of the power generating body on which the diffusion layer is laminated and a lamination surface of a corresponding one of the separators which is laminated on the diffusion layer.

With the fuel cell constructed as described above, gas is prevented from leaking into space formed between the diffusion layers and the first seal, and, therefore, a reduction in the power generating efficiency of the fuel cell due to gas leakage can be suppressed.

In the fuel cell according to the above aspect of the invention, a material that forms the second seal and the shape of the second seal prior to stacking of the power generating body, diffusion layers and the separators may be determined so that the second seal is deformed when sandwiched between the power generating body and the corresponding separator during the stacking.

With this arrangement, the second seal can be formed so as to be in intimate contact with the lamination surface of the power generating body and the lamination surface of the separator.

In the fuel cell according to the above aspect of the invention, the thickness of the second seal measured in a stacking direction of the fuel cell prior to the stacking may be larger than the thickness of the diffusion layer on which the second seal is formed.

With this arrangement, the second seal can be deformed when it is sandwiched between the power generating body and the corresponding separator at the time of stacking of the fuel cell.

In the fuel cell according to the above aspect of the invention, the second seal may be shaped prior to the stacking so as not to project from a plane that is flush with at least one of opposite major surfaces of the diffusion layer.

With this arrangement, the diffusion layer formed integrally with the second seal can be easily joined at one of the opposite lamination surfaces thereof to a lamination surface of another member, such as a separator, thus assuring improved efficiency with which the fuel cell is manufactured.

In the fuel cell according to the above aspect of the invention, the second seal may be formed so as to cover the entire area of the end face of the diffusion layer.

With this arrangement, leakage of gas into the space formed between the diffusion layers and the first seal can be suppressed or prevented with higher reliability, and, therefore, a reduction in the power generating efficiency of the fuel cell can be suppressed.

In the fuel cell according to the above aspect of the invention, the second seal may be in intimate contact with a part of the first seal.

With this arrangement, gas is prevented from leaking into the space formed between the diffusion layers and the first seal via the lamination surfaces of the power generating body, and, therefore, a reduction in the power generating efficiency of the fuel cell can be suppressed.

In the fuel cell according to the above aspect of the invention, the first seal may include a covering portion that covers each of opposite lamination surfaces of an end portion of the power generating body on which the diffusion layers are laminated, and the second seal may include a portion that is located outside the end face of the diffusion layer and is in intimate contact with the entire region of the lamination surface of the power generating body which is not covered with the covering portion.

With this arrangement, leakage of gas into the space formed between the diffusion layers and the first seal via the lamination surfaces of the power generating body can be suppressed or prevented with higher reliability, and, therefore, a reduction in the power generating efficiency of the fuel cell can be suppressed.

In the fuel cell according to the above aspect of the invention, the second seal may be formed of a material having lower stiffness than that of the first seal.

With this arrangement, even where the first seal and the second seal interfere with each other or overlap each other in the stacking direction, the second seal is deformed so as to prevent incomplete sealing and/or variations in the surface pressure and thus avoid a reduction in the power generating capability of the fuel cell.

In the fuel cell according to the above aspect of the invention, the major surface of each of the separators which faces a corresponding one of the diffusion layers may have a flat shape.

Even in the fuel cell of this type in which it is relatively difficult to control gas flow, leakage of reaction gas into the space formed between the diffusion layers and the first seal can be suppressed, and, therefore, a reduction in the power generating efficiency can be suppressed.

A second aspect of the invention relates to a method of manufacturing a fuel cell, including the steps of: (a) preparing a power generating body including an electrolyte layer and electrode layers disposed on opposite major surfaces of the electrolyte layer, a plurality of diffusion layers having internal channels through which a gas used for power generation flows so that the gas is supplied to the power generating body, and a plurality of separators adapted to supply the gas to the diffusion layers, (b) placing the diffusion layers on opposite major surfaces of the power generating body, (c) forming a first seal along an end face of the power generating body, (d) forming a second seal integrally with at least one of the diffusion layers so as to extend along an end face of the diffusion layer, and (e) placing the separators on major surfaces of the diffusion layers opposite to major surfaces thereof facing the power generating body, and bringing the second seal into intimate contact with a lamination surface of the power generating body on which the diffusion layer is laminated and a lamination surface of a corresponding one of the separators which is laminated on the diffusion layer.

It is to be understood that the invention may be implemented in various forms, for example, in the forms of a fuel cell, a method of manufacturing a fuel cell, a unit cell for a fuel cell, and a mobile unit having a fuel cell.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF THE PREFERRED EMBODIMENTS

In the following description, the invention will be described in more detail in terms of exemplary embodiments.

Figure 1A:
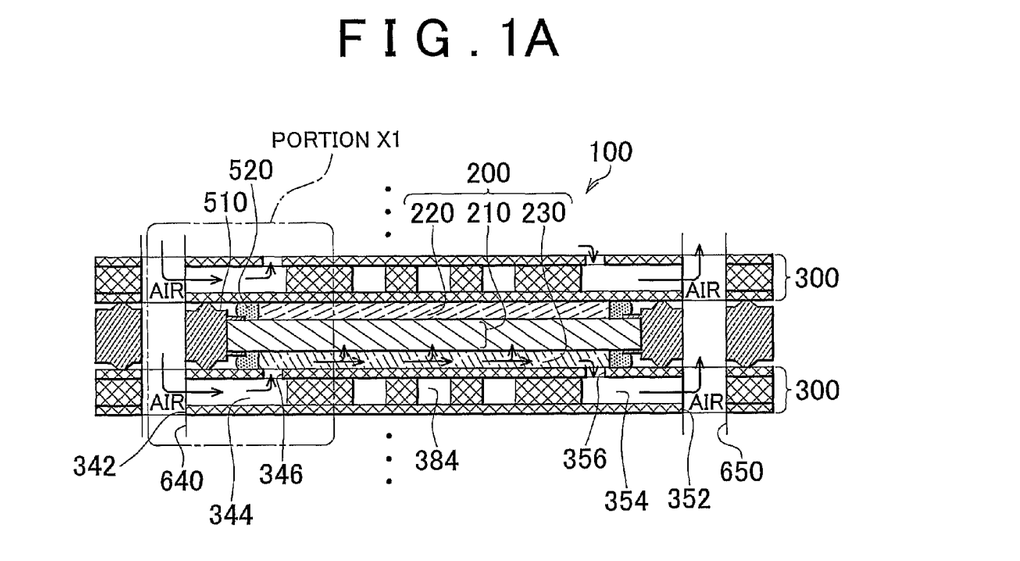
FIG. 1A and FIG. 1B are cross-sectional views schematically showing a fuel cell constructed according to a first embodiment of the invention.
Figure 1B:
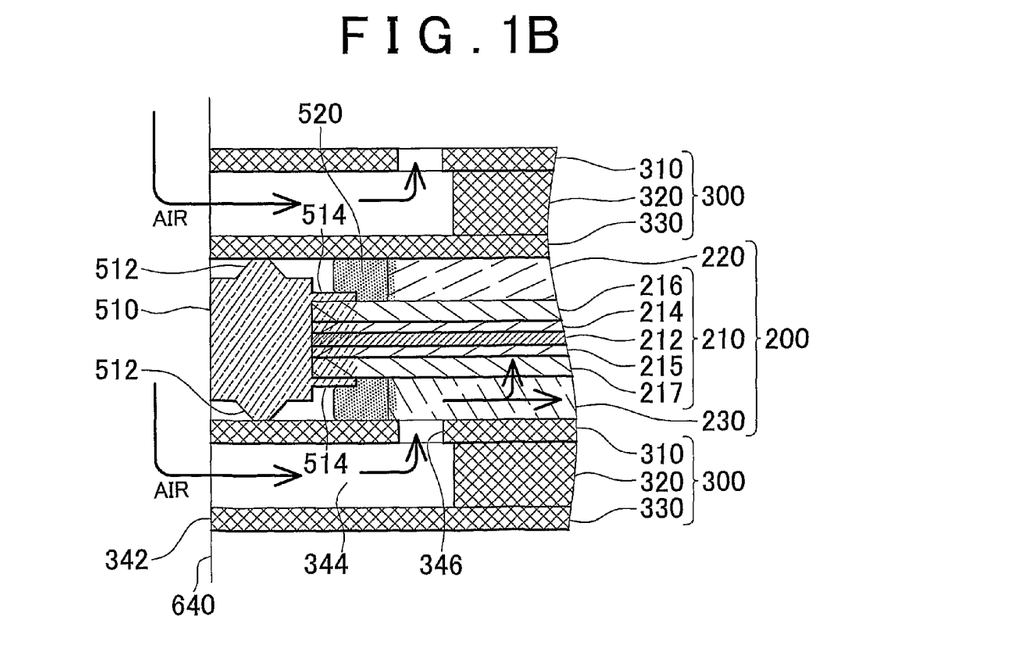
Figure 2A:
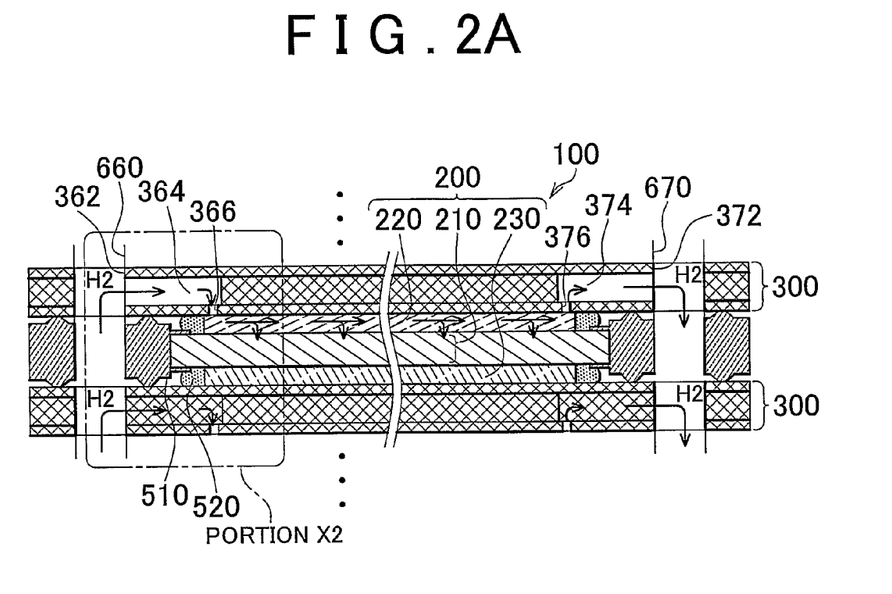
FIG. 2A and FIG. 2B are cross-sectional views schematically showing the fuel cell constructed according to the first embodiment of the invention.
Figure 2B:
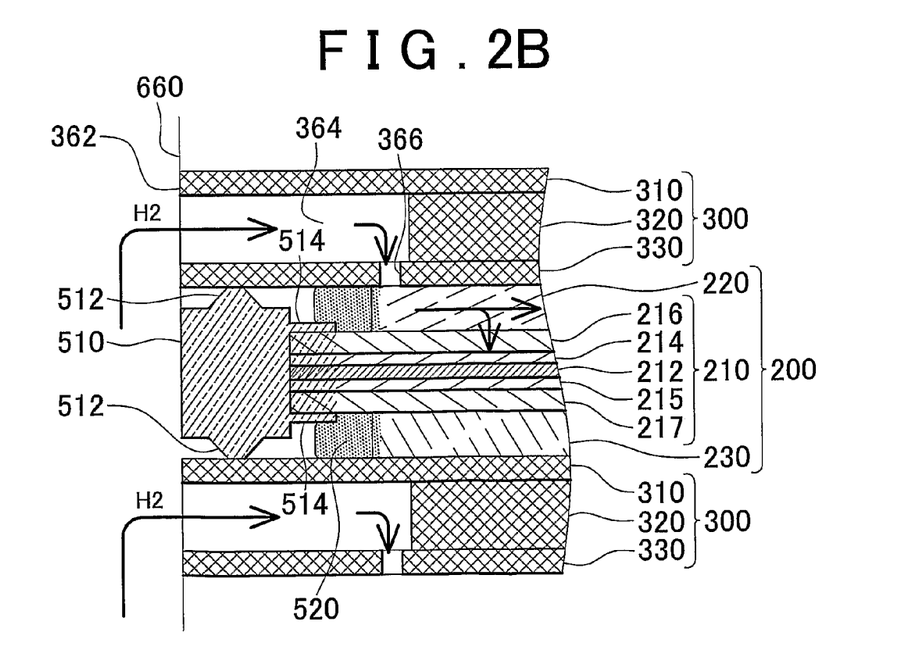
Figure 3:
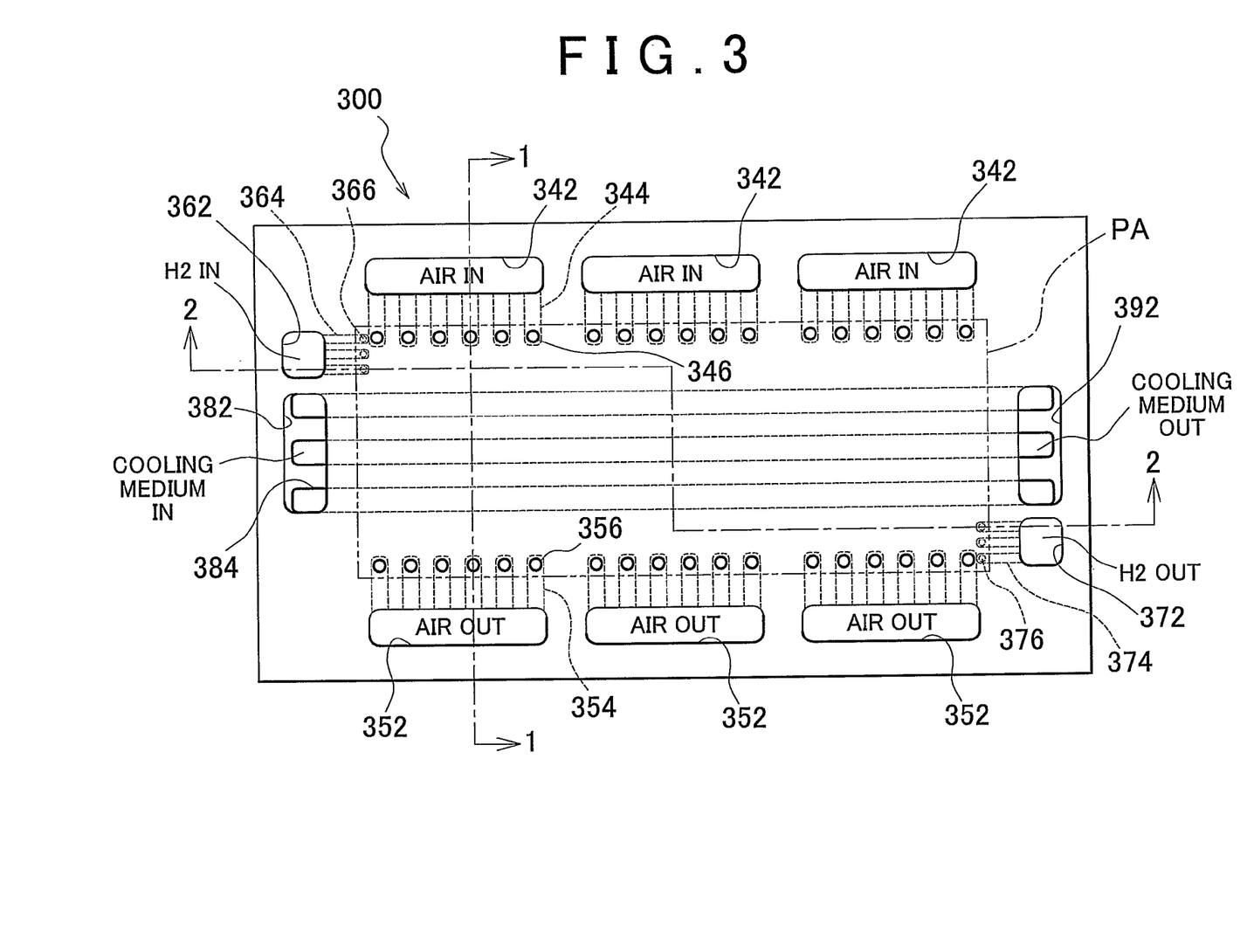
FIG. 3 is a plan view schematically showing the fuel cell as the first embodiment of the invention.
Figure 4:
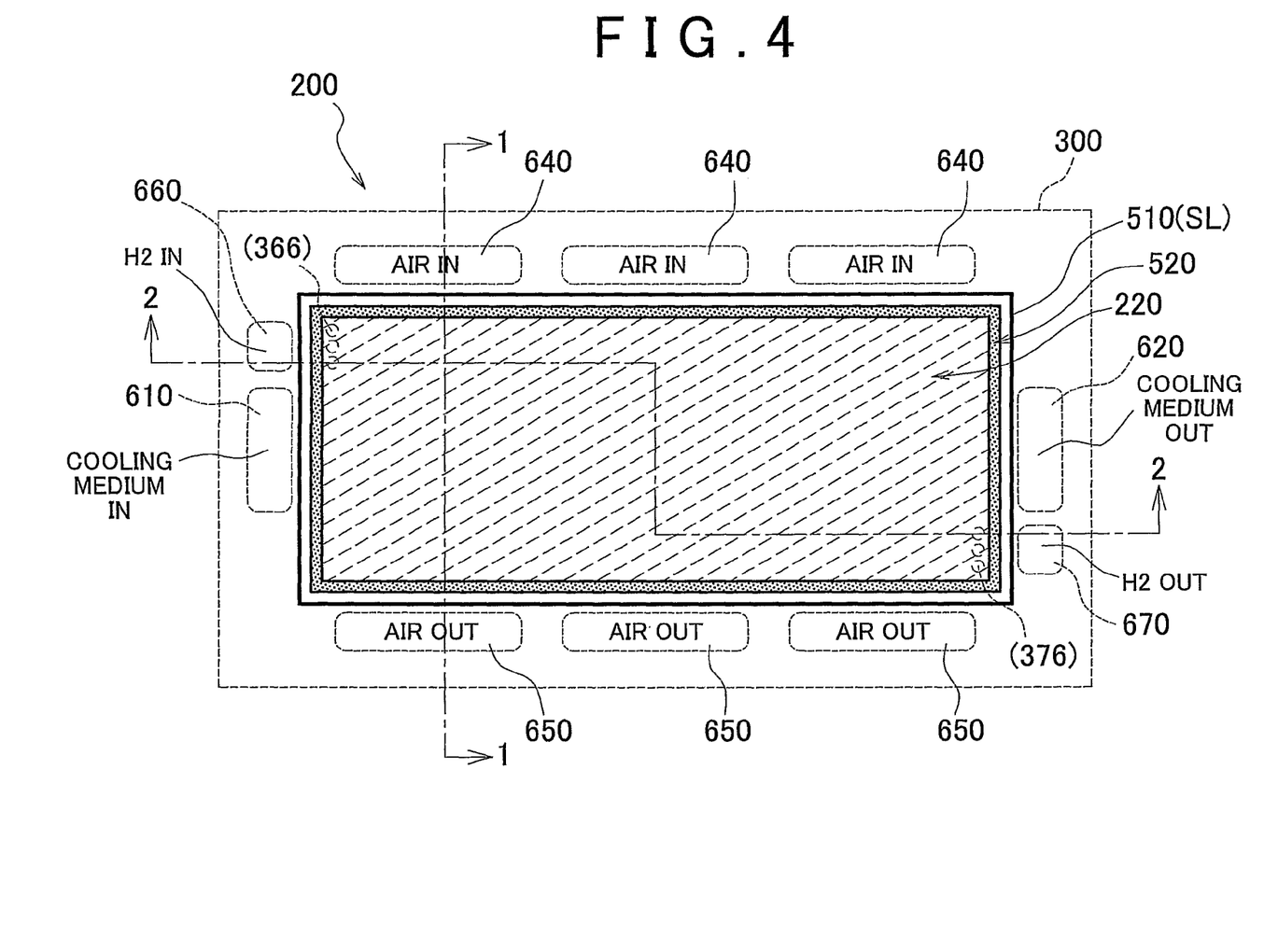
FIG. 4 is a plan view schematically showing the fuel cell as the first embodiment of the invention.

A first embodiment of the invention will be described. FIG. 1A, FIG. 1B, FIG. 2A and FIG. 2B are cross-sectional views schematically showing a fuel cell 100 constructed according to the first embodiment. FIG. 3 and FIG. 4 are plan views schematically showing the fuel cell 100 of the first embodiment. More specifically, FIG. 1A shows a section of the fuel cell 100 taken along line 1-1 in FIG. 3 and FIG. 4, and FIG. 1B is an enlarged view of a portion X1 of the fuel cell 100 shown in FIG. 1A. FIG. 2A shows a section of the fuel cell 100 taken along line 2-2 in FIG. 3 and FIG. 4, and FIG. 2B is an enlarged view of a portion X2 of the fuel cell 100 shown in FIG. 2A. FIG. 3 is a plane figure of a separator 300 as viewed from the top in FIGS. 1A and 1B and FIGS. 2A and 2B. In FIG. 3, region PA delimited by two-dot chain lines represent a region that is in contact with a unit cell 200 (more specifically, a cathode-side first diffusion layer 230 as described later). FIG. 4 is a plane figure of the unit cell 200 as viewed from the top in FIGS. 1A and 1B and FIGS. 2A and 2B.

The fuel cell 100 is a device that generates electric power using, for example, air as an oxidizing gas and a hydrogen-rich fuel gas. The fuel cell 100 of this embodiment is a polymer electrolyte fuel cell. As shown in FIGS. 1A and 1B and FIGS. 2A and 2B, the fuel cell 100 consists principally of unit cells 200 and separators 300 that are alternately laminated or stacked together. FIGS. 1A and 1B and FIGS. 2A and 2B show only one unit cell 200 and a pair of separators 300 provided on the opposite sides of the unit cell 200, and the rest of the unit cells 200 and separators 300 of the fuel cell 100 are not illustrated. In this specification, the direction in which the respective elements of the fuel cell 100 are stacked together, namely, the vertical direction as viewed in FIGS. 1A and 1B and FIGS. 2A and 2B, will be called "stacking direction of the fuel cell 100", or simply called "stacking direction".

The unit cell 200 has a power generating body 210, a first diffusion layer 220 disposed on the anode side as one of the opposite sides of the power generating body 210, and a first diffusion layer 230 disposed on the cathode side as the other side of the power generating body 210, as shown in FIG. 1A and FIG. 2A. The first diffusion layers 220, 230 are arranged to sandwich the power generating body 210 therebetween. In the following description, the first diffusion layer 220 disposed on the anode side will be simply called "anode-side first diffusion layer 220", and the first diffusion layer 230 disposed on the cathode side will be simply called "cathode-side first diffusion layer 230". Also, the anode-side first diffusion layer 220 and cathode-side first diffusion layer 230 will be collectively called "first diffusion layers 220 and 230" when appropriate. Each of the first diffusion layers 220 and 230 is formed from a metallic porous body or carbon porous body which has a high internal porosity and shows a small pressure loss when gas flows through the interior thereof, and functions as a porous-body channel that allows reaction gas (air or fuel gas) used for power generation by the power generating body 210 to flow therethrough.

The power generating body 210 includes an electrolyte layer 212 formed from an ion exchange film, and anode-side catalyst electrode layer 214 and cathode-side catalyst electrode layer 215 that are disposed on the opposite sides of the electrolyte layer 212 so as to sandwich the layer 212 therebetween, as shown in FIG. 1B and FIG. 2B. The anode-side catalyst electrode layer 214 and cathode-side catalyst electrode layer 215 contain carbon carrying a catalyst. A stacked or laminated structure of the electrolyte layer 212 and the anode-side catalyst electrode layer 214 and cathode-side catalyst electrode layer 215 will be called "MEA (membrane electrode assembly)".

In the embodiment, the power generating body 210 further includes a second diffusion layer 216 of the anode side, which is disposed on one of the opposite major surfaces of the anode-side catalyst electrode layer 214 the other surface of which faces the electrolyte layer 212, and a second diffusion layer 217 of the cathode side, which is disposed on one of the opposite major surfaces of the cathode-side catalyst electrode layer 215 the other surface of which faces the electrolyte layer 212. In the following description, the second diffusion layer 216 of the anode side will be simply called "anode-side second diffusion layer 216", and the second diffusion layer 217 of the cathode side will be simply called "cathode-side second diffusion layer 217". Also, the anode-side second diffusion layer 216 and cathode-side second diffusion layer 217 will be collectively called "second diffusion layers 216 and 217" when appropriate. Each of the second diffusion layers 216 and 217 is formed from a metallic porous body or carbon porous body which has a high internal porosity and shows a small pressure loss when gas flows through the interior thereof. The power generating body 210 of this embodiment constructed as described above is also called "MEGA".

As shown in FIG. 1B and FIG. 2B, the separator 300 has a three-layer laminated structure consisting of a cathode-facing plate 310 that faces the cathode-side first diffusion layer 230, an anode-facing plate 330 that faces the anode-side first diffusion layer 220, and an intermediate plate 320 sandwiched by and between the cathode-facing plate 310 and the anode-facing plate 330. Each of the three plates (i.e., the cathode-facing plate 310, anode-facing plate 330 and intermediate plate 320) that constitute the separator 330 is in the form of a generally rectangular, flat thin plate made of metal.

The fuel cell 100 is provided with air supply channels 640 through which air used for power generation is supplied, and air discharge channels 650 through which air that was not used for power generation is discharged, as shown in FIG. 1A. The separator 300 is formed with channels for guiding air supplied from the air supply channels 640 to the corresponding unit cell 200, and channels for guiding air discharged from the unit cell 200 to the air discharge channels 650, as shown in FIG. 1A and FIG. 3. More specifically, the separator 300 has through-holes 342 through which the air supply channels 640 extend, air channels 344 for guiding air from the air supply channels 640 to the inside thereof, and air supply ports 346 formed through the cathode-facing plate 310 so as to communicate the air channels 344 with a surface of the cathode-side first diffusion layer 230. The separator 300 also has through-holes 352 through which the air discharge channels 650 extend, air channels 354 for guiding air to the air discharge channels 650, and air discharge ports 356 formed through the cathode-facing plate 310 so as to communicate the air channels 354 with the surface of the cathode-side first diffusion layer 230. The air supplied to the air supply channels 640 flows into the interior of the cathode-side first diffusion layer 230 via the through-holes 342, air channels 344 and the air supply ports 346, as indicated by arrows in FIG. 1A and FIG. 1B. Thereafter, the air is used for power generation by the power generating body 210 while passing through the interior of the cathode-side first diffusion layer 230, and part of the air that was not used for power generation is discharged to the air discharge channels 650 via the air discharge ports 356, air channels 354 and the through-holes 352.

Similarly, the fuel cell 100 is provided with a fuel supply channel 660 through which fuel gas used for power generation is supplied, and a fuel discharge channel 670 through which the fuel gas that was not used for power generation is discharged, as shown in FIG. 2A. The separator 300 is formed with channels for guiding the fuel gas supplied from the fuel supply channel 660 to the corresponding unit cell 200, and channels for guiding the fuel gas discharged from the unit cell 200 to the fuel discharge channel 670, as shown in FIG. 2A and FIG. 3. More specifically, the separator 300 has a through-hole 362 through which the fuel supply channel 660 extends, fuel channels 364 for guiding the fuel gas from the fuel supply channel 660 to the inside thereof, and fuel supply ports 366 formed through the anode-facing plate 330 so as to communicate the fuel channels 364 with a surface of the anode-side first diffusion layer 220. The separator 300 also has a through-hole 372 through which the fuel discharge channel 670 extends, fuel channels 374 for guiding the fuel gas to the fuel discharge channel 670, and fuel discharge ports 376 formed through the anode-facing plate 330 so as to communicate the fuel channels 374 with the surface of the anode-side first diffusion layer 220. The fuel gas supplied to the fuel supply channel 660 flows into the interior of the anode-side first diffusion layer 220 via the through-hole 362, fuel channels 364 and the fuel supply ports 366, as indicated by arrows in FIG. 2A and FIG. 2B. Thereafter, the fuel gas is used for power generation by the power generating body 210 while passing through the interior of the anode-side first diffusion layer 220, and part of the fuel gas that was not used for power generation is discharged to the fuel discharge channel 670 via the fuel discharge ports 376, fuel channels 374 and the through-hole 372.

Furthermore, the separator 300 is formed with channels through which a cooling medium for cooling the fuel cell 100 flows. More specifically, the separator 300 has a through-hole 382 (FIG. 3) through which a cooling medium supply channel (not shown) for supplying the cooling medium extends, a through-hole 392 (FIG. 3) through which a cooling medium discharge channel (not shown) for discharging the cooling medium extends, and cooling medium channels 384 (FIG. 3 and FIG. 1A) that communicate with the two through-holes 382 and 392 for connection therebetween. The cooling medium supplied to the cooling medium supply channel passes through the through-hole 382, cooling medium channels 384 and the through-hole 392, to be discharged to the cooling medium discharge channel.

Thus, the major surfaces of the separator 300 which face adjacent unit cells 200 are formed in a flat shape, and have no grooves that provide channels for reaction gas. To form the above-mentioned channels for air, fuel gas and cooling medium in the separator 300, the three plates (i.e., the cathode-facing plate 310, anode-facing plate 330 and intermediate plate 320) that constitute the separator 300 are stamped into certain patterns. Thus, the fuel cell 100 of this embodiment has an advantage that the separators 300 can be easily fabricated at a reduced cost.

As shown in FIGS. 1A and 1B and FIGS. 2A and 2B, a first seal 510 is provided around the power generating body 210 so as to extend along end faces of the power generating body 210. The first seal 510 functions as a gasket for suppressing leakage of the reaction gas (fuel gas and air) supplied to the unit cell 200 to the outside of the fuel cell 100 and also suppressing flow (so-called crossleak) of the reaction gas between the anode side and the cathode side via the end faces of the power generating body 210. In this specification, a surface of each member or element of the laminated structure, which is parallel to the direction of the thickness thereof, will be called "end face", and a major surface of the member perpendicular to the direction of the thickness thereof will be called "lamination surface". The end faces of the power generating body 210 may correspond with the outer periphery of the power generating body 210.

The first seal 510 is formed by injection molding using a sealing material containing, for example, rubber. In forming the first seal 510, part of the power generating body 210 is impregnated with the sealing material that forms the first seal portion 510, so that the first seal portion 510 and the power generating body 210 are bonded to each other due to a so-called anchoring effect. In FIG. 1B and FIG. 2B, the sealing material that penetrates into the power generating body 210 is represented by the same hatch pattern as that representing the first seal 510.

The first seal 510 is formed so as to cover the entire areas of the end faces of the respective layers that constitute the power generating body 210. Also, the first seal 510 has lips 512 in the form of projections on both of the anode and cathode sides thereof. The lips 512 correspond with effective seal portions of the invention. The lips 512 are in intimate contact with the surfaces (lamination surfaces) of the separators 300. In the embodiment, the sealing material is injected toward not only the end faces of the power generating body 210, but also the lamination surfaces of end portions of the power generating body 210, so that the end portions of the power generating body 210 are favorably impregnated with the sealing material. With the sealing material thus injected, the first seal 510 has covering portions 514 that cover the lamination surfaces of the end portions of the power generating body 210.

As shown in FIG. 4, the first seal 510 is placed so as to surround the periphery of the power generating body 210. In FIG. 4, the first seal 510 is denoted by a contact portion (seal line SL) between the lip 512 of the first seal 510 and the corresponding separator 300. While only the first seal 510 of the anode side is illustrated in FIG. 4, the first seal 510 is also placed similarly on the cathode side so as to surround the periphery of the power generating body 210.

As described above, the first seal 510 is placed so as to surround the periphery of the power generating body 210, and the lips 512 of the first seal 510 are in intimate contact with the surfaces of the separators 300; therefore, leakage of the reaction gas from the inside to the outside of the fuel cell 100 is suppressed. Also, the first seal 510 covers the entire areas of the end faces of the power generating body 210, and the end portions of the power generating body 210 are impregnated with the sealing material; therefore, crossleak of the reaction gas is suppressed.

As shown in FIG. 1B and FIG. 2B, the covering portions 514 of the first seal 510 and the first diffusion layers 220 and 230 are located with a certain distance or spacing therebetween, without interfering with each other. This arrangement is employed so as to avoid a situation where the power generating capability of the fuel cell is reduced due to incomplete sealing and/or variations in the surface pressure, which would occur when the covering portions 514 and the first diffusion layers 220 and 230 interfere with each other in the stacking direction because of dimensional errors, or the like.

As shown in FIGS. 1A and 1B and FIGS. 2A and 2B, second seals 520 are provided around the first diffusion layers 220 and 230 so as to extend along the end faces of the first diffusion layers 220 and 230. Like the first seal 510, the second seals 520 are formed by injection molding. Here, the second seals 520 are formed of a material having lower stiffness than that of the first seal 510. For example, an elastomer-type resin or a sealing material containing rubber is used for forming the second seals 520.

In forming the second seals 520, parts of the first diffusion layers 220 and 230 are impregnated with the sealing material that forms the second seals 520, so that the second seals 520 are bonded to the first diffusion layers 220 and 230 due to a so-called anchoring effect. In FIG. 1B and FIG. 2B, the sealing material that penetrates into the first diffusion layers 220 and 230 is represented by the same hatch pattern as that representing the second seals 520.

The second seals 520 are formed so as to cover the entire areas of the end faces of the first diffusion layers 220 and 230. Also, portions of the second seals 520 located outside the end faces of the first diffusion layers 220, 230 are in intimate contact with the lamination surfaces of the corresponding separators 300, and are also in intimate contact with the power generating body 210 so as to cover the entire areas of the exposed lamination surfaces of the power generating body 210 which are not covered with the covering portions 514 of the first seal 510. The second seals 520 interfere with (or overlap) the covering portions 514 in the stacking direction.

As shown in FIG. 4, the second seal 520 is placed so as to surround the periphery of the anode-side first diffusion layer 220. While only the second seal 520 of the anode side is illustrated in FIG. 4, the second seal 520 is also placed similarly on the cathode side so as to surround the periphery of the cathode-side first diffusion layer 230.

Figure 5A:
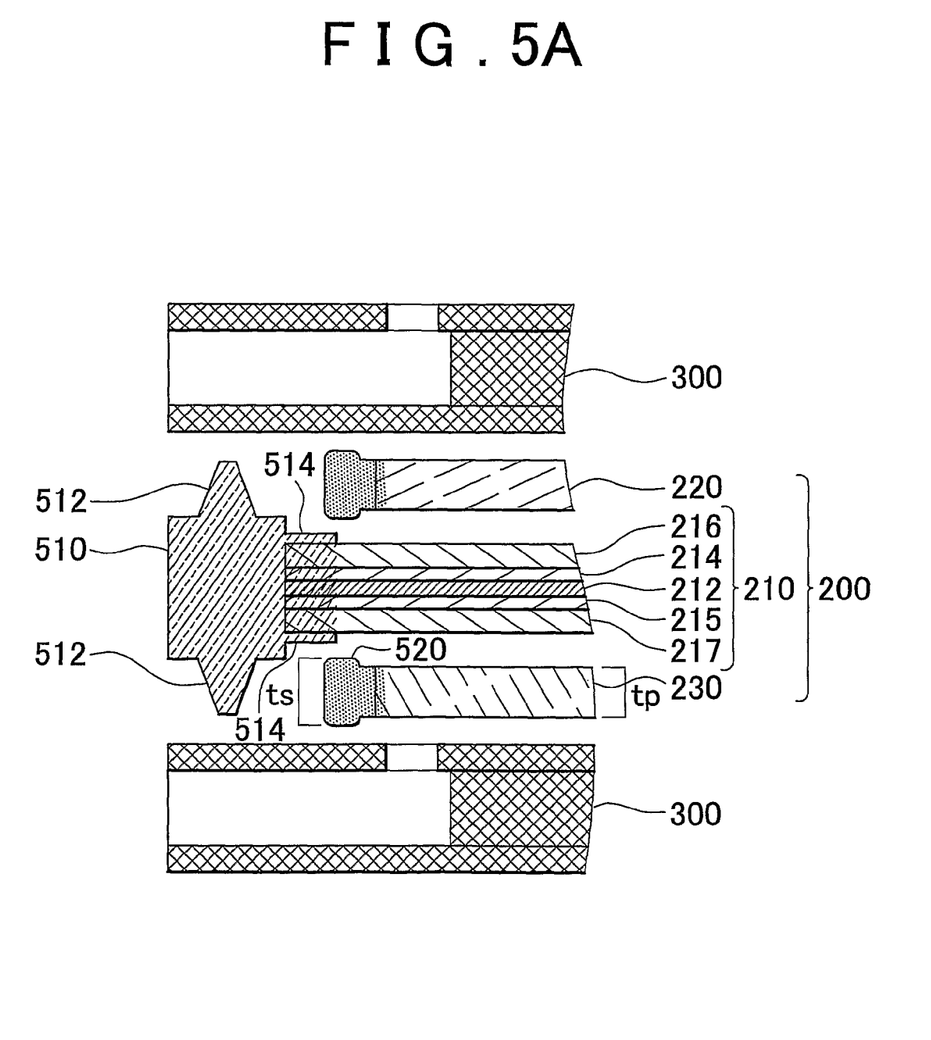
FIG. 5A and FIG. 5B are cross-sectional views useful for explaining a method of manufacturing the fuel cell according to the first embodiment.
Figure 5B:
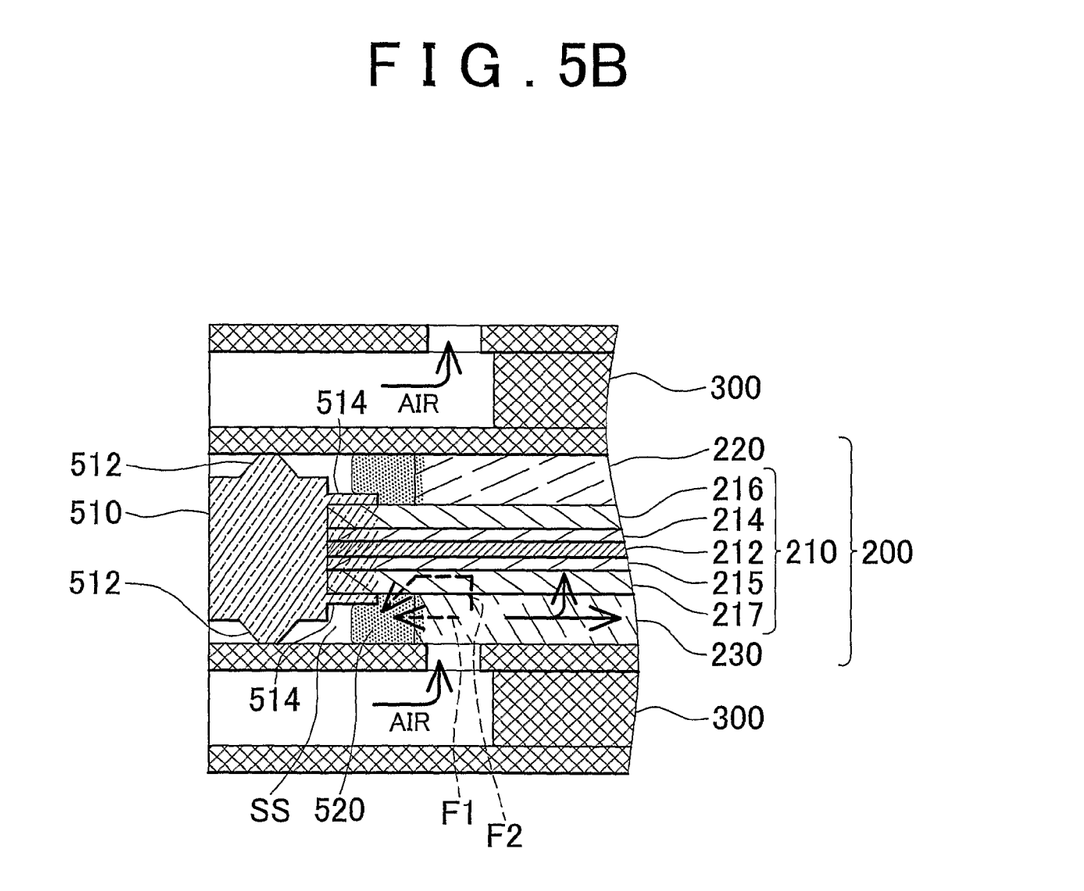

FIG. 5A and FIG. 5B are explanatory views schematically illustrating a method of manufacturing the fuel cell 100 according to the first embodiment of the invention. FIG. 5A shows conditions of the respective members or elements of the fuel cell 100 presented before the power generating body 210, first diffusion layers 220 and 230 and the separators 300 are stacked together. As shown in FIG. 5A, the power generating body 210 is formed integrally with the first seal 510 prior to stacking. The thickness of the first seal 510 measured at this time in the stacking direction at a position where the lips 512 are located is set to be larger than the sum of the thickness of the power generating body 210 and those of the first diffusion layers 220 and 230.

Prior to stacking, each of the first diffusion layers 220 and 230 is formed integrally with the second seal 520. The maximum thickness is of the second seal 520 measured at this time in the stacking direction is set to be larger than the thickness tp of the first diffusion layer 220, 230, as shown in FIG. 5A.

Subsequently, the respective members of the fuel cell 100 as shown in FIG. 5A are stacked and fastened together. FIG.

5B illustrates a condition of the fuel cell 100 similar to that of the FIG. 1A. When the respective members that constitute the fuel cell 100 are stacked together, the lips 512 of the first seal 510 are compressed by the separators 300, and are brought into intimate contact with the lamination surfaces of the separators 300. At the same time, the second seals 520 are sandwiched by and between the power generating body 210 and the separators 300, to be deformed, and are brought into intimate contact with the lamination surfaces (more specifically, the entire regions of the exposed lamination surfaces that are not covered with the covering portions 514) of the power generating body 210 and the lamination surfaces of the separators 300. In the embodiment, the second seals 520 interfere with (or overlap) the covering portions 514 of the first seal 510 in the stacking direction, but the second seals 520, which are formed of a material having lower stiffness than that of the first seal 510, are deformed upon stacking, thus eliminating problems of incomplete sealing and variations in the surface pressure.

In the fuel cell 100 manufactured in the manner as described above, the second seals 520, more specifically, their portions located outside the end faces of the first diffusion layers 220 and 230, are in intimate contact with the lamination surfaces of the separators 300 and with the entire regions of the exposed lamination surfaces of the power generating body 210 which are not covered with the covering portions 514 of the first seal 510. In the fuel cell 100, therefore, the reaction gas can be prevented from leaking into space (which will be called "diffusion-layer surrounding space SS") formed between the first diffusion layers 220 and 230 and the first seal 510. More specifically, air is prevented from leaking from the interior of the cathode-side first diffusion layer 230 into the diffusion-layer surrounding space SS via the end face of the cathode-side first diffusion layer 230 (as indicated by broken-line arrow F1 in FIG. 5B). Furthermore, air admitted into the cathode-side second diffusion layer 217 is also prevented from leaking into the diffusion-layer surrounding space SS (as indicated by broken-line arrow F2 in FIG. 5B), via the exposed lamination surface of the power generating body 210 which is not covered with the covering portion 514 of the first seal 510. On the anode side, too, leakage of the fuel gas into the diffusion-layer surrounding space SS is suppressed in similar manners.

If part of the reaction gas leaks into the diffusion-layer surrounding space SS, and passes the space SS to be discharged as it is to the outside of the fuel cell 100, that part of the reaction gas is not used for power generation, resulting in a reduction in the power generating efficiency of the fuel cell 100. In the fuel cell 100 of this embodiment, leakage of the reaction gas into the diffusion-layer surrounding space SS can be suppressed, and, therefore, the power generating efficiency can be prevented from being reduced due to the gas leakage.

In a sealing method using a filler-type seal, such as a liquid gasket, to provide seals after stacking, it is difficult to place the sealing material in a small clearance such as the diffusion-layer surrounding space SS. In the embodiment in which the second seals 520 are formed integrally on the first diffusion layers 220 and 230 prior to stacking of the respective members of the fuel cell 100, the sealing material can be surely placed in a small clearance such as the diffusion-layer surrounding space SS, while assuring a reduction in the number of components and improved efficiency with which the components are assembled together.

In the fuel cell 100 of the embodiment, the major surfaces of each separator 300 facing the adjacent unit cells 200 are formed in a flat shape, and the separator 300 has no grooves that provide channels for reaction gas. Therefore, the reaction gas flows through the interiors of the first diffusion layers 220 and 230, instead of the channels in the form of grooves. When the interiors of the first diffusion layers 220 and 230 are used as channels for reaction gas, it is difficult to control the flow of the gas, as compared with the case where the grooves are used as channels. In the case where the interiors of the first diffusion layers 220 and 230 are used as channels for reaction gas, therefore, leakage of the reaction gas into the diffusion-layer surrounding space SS becomes a more serious problem. In the fuel cell 100 of this embodiment, leakage of the reaction gas into the diffusion-layer surrounding space SS can be suppressed, and the power generating efficiency can be prevented from being reduced, even though the major surfaces of the separator 300 facing the unit cells 200 are formed in a flat shape.

Figure 6:
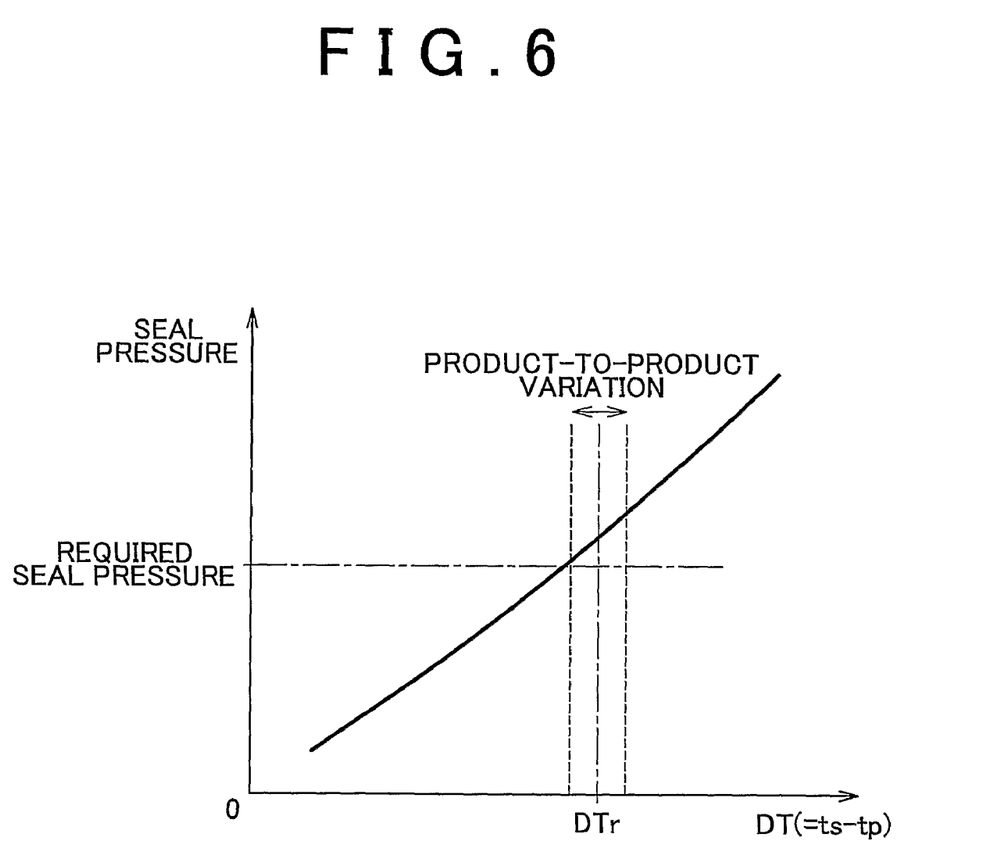
FIG. 6 is a graph useful for explaining a method of setting the thickness is of a second seal measured in the stacking direction prior to stacking of the fuel cell.

FIG. 6 is a graph useful for explaining a method of setting the thickness ts (FIG. 5A) of the second seal 520 measured in the stacking direction prior to stacking of the fuel cell 100. In FIG. 6, the horizontal axis indicates a difference (which will be called "thickness difference DT") between the thickness ts of the second seal 520 measured in the stacking direction and the thickness tp of the first diffusion layer 220, 230, and the vertical axis indicates a seal pressure of the second seal 520. The thickness difference DT and the seal pressure are generally proportional to each other. The seal pressure required of the second seal 520 (which will be called "required seal pressure") is equal to a difference between supply pressure and discharge pressure of the reaction gas. Once the required seal pressure is set, and product-to-product variation is set, the required thickness difference DTr is determined. Once the required thickness difference DTr and the thickness tp of the first diffusion layer 220, 230 are set, the thickness ts of the second seal 520 in the stacking direction is set based on these values.

Figure 7:
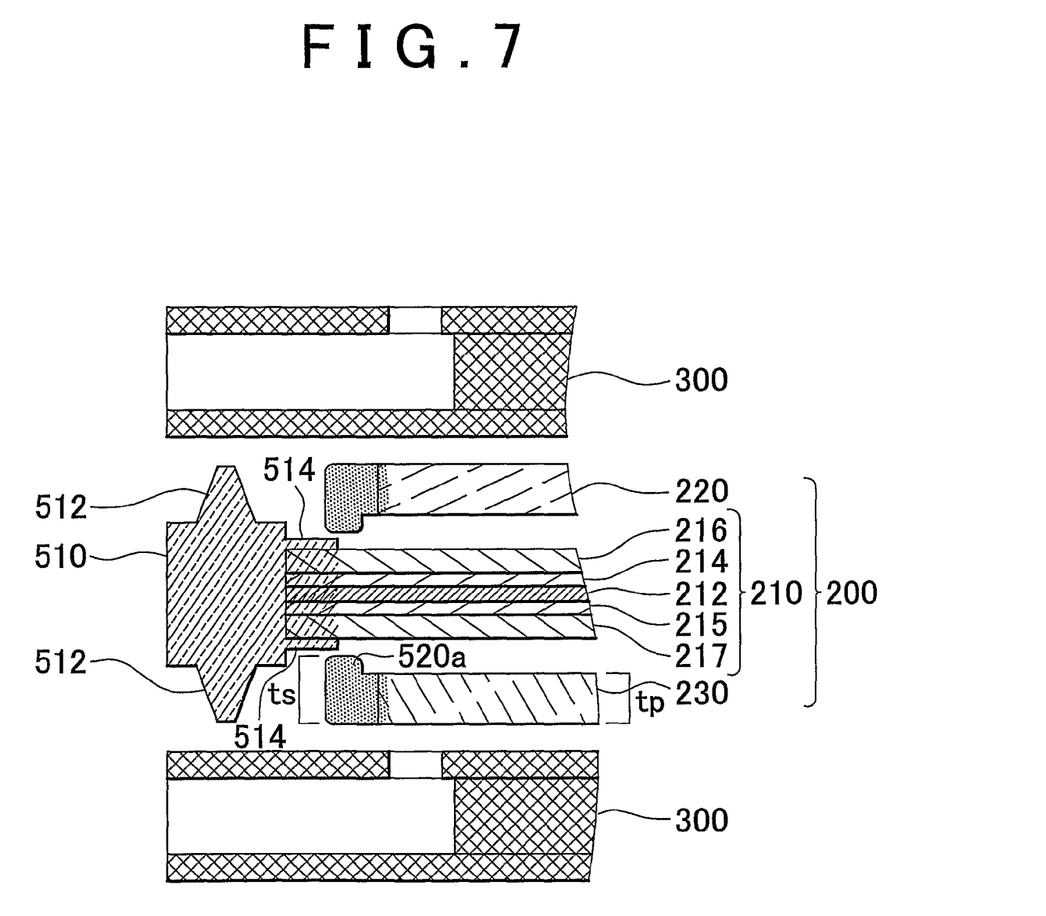
FIG. 7 is a cross-sectional view useful for explaining a method of manufacturing the fuel cell according to a second embodiment of the invention.

A second embodiment of the invention will be described. FIG. 7 is an explanatory view schematically illustrating a method of manufacturing the fuel cell 100 according to the second embodiment. In this embodiment, the shape of second seals 520a formed along the end faces of the first diffusion layers 220 and 230 prior to stacking of the fuel cell 100 is different from that of the first embodiment as shown in FIG. 5A. The other features of the fuel cell 100 are similar to those of the first embodiment.

In the fuel cell 100 of the second embodiment, a section of the second seal 520a parallel to the stacking direction is shaped so as not to intersect a plane including the lamination surface of the first diffusion layer 220, 230 which faces the corresponding separator 300, as shown in FIG. 7. Namely, the second seal 520a is shaped such that the surface of the second seal 520a which faces the separator 300 is generally flush with the lamination surface of the corresponding first diffusion layer 220, 230 which faces the separator 300.

In the meantime, the maximum thickness ts of the second seal 520a measured in the stacking direction is larger than the thickness tp of the first diffusion layer 220, 230. To provide the thickness difference, the section of the second seal 520a parallel to the stacking direction is shaped so as to intersect a plane including the other lamination surface (facing the power generating body 210) of the first diffusion layer 220, 230. Namely, the second seal 520a projects a certain distance from the plane including the other lamination surface of the first diffusion layer 220, 230, toward the power generating body 210.

In the embodiment, the respective members of the fuel cell 100 as shown in FIG. 7 are stacked and fastened together. In this process, the first diffusion layers 220 and 230 are initially joined to the corresponding separators 300. Thereafter, a laminated assembly of the anode-side first diffusion layer 220 and separator 300 joined to each other and a laminated assembly of the cathode-side first diffusion layer 230 and separator 300 joined to each other are joined to the power generating body 210. Thus, the fuel cell 100 constructed as shown in FIG. 5B is fabricated in a manner similar to that of the first embodiment.

In the second embodiment, the second seals 520a, more specifically, their portions located outside the end faces of the first diffusion layers 220 and 230, are in intimate contact with the lamination surfaces of the separators 300, and are in intimate contact with the power generating body 210 so as to cover the entire regions of the exposed lamination surfaces of the power generating body 210 which are not covered with the covering portions 514 of the first seal 510, as in the first embodiment. Accordingly, leakage of reaction gas into the diffusion-layer surrounding space SS can be suppressed, and an otherwise possible reduction in the power generating efficiency can be suppressed.

In the embodiment, when the respective members that constitute the fuel cell 100 are stacked together, the first diffusion layers 220 and 230 formed integrally with the second seals 520a are initially joined to the corresponding separators 300. Prior to stacking, the section of the second seal 520a parallel to the stacking direction is shaped so as not to intersect the plane containing the lamination surface of the first diffusion layer 220, 230 which faces the separator 300, as described above. Therefore, the first diffusion layers 220 and 230 can be easily joined to the separators 300. Accordingly, the fuel cell 100 of the second embodiment can be more easily manufactured.

Figure 8A:
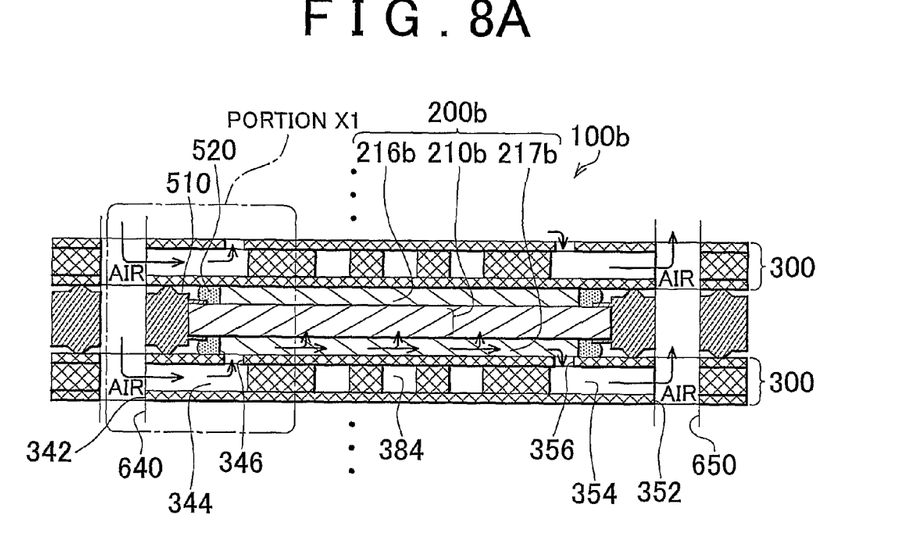
FIG. 8A and FIG. 8B are cross-sectional views schematically showing a fuel cell constructed according to a third embodiment of the invention.
Figure 8B:
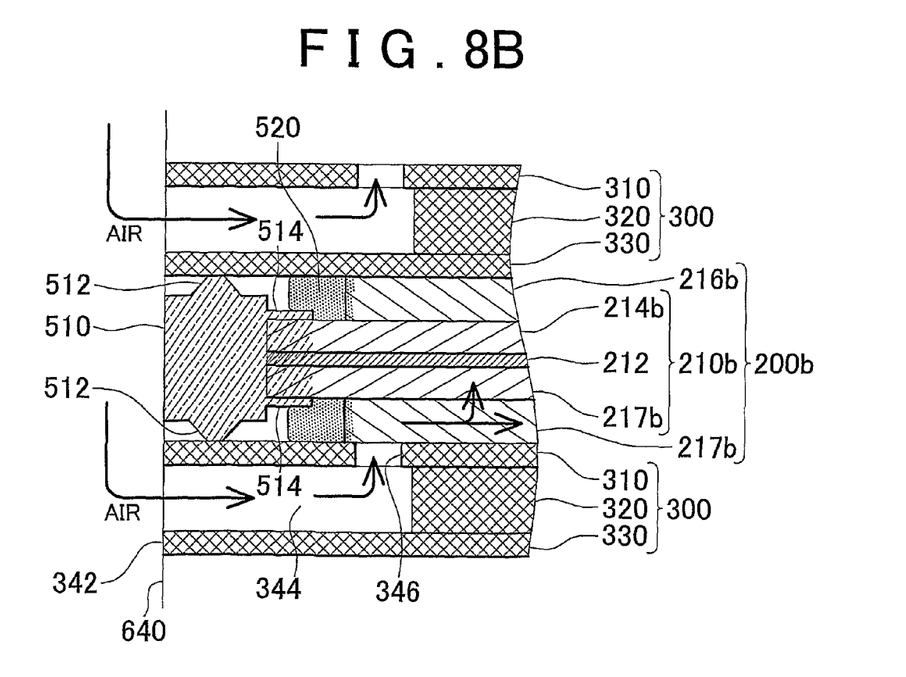

A third embodiment of the invention will be described. FIG. 8A and FIG. 8B are cross-sectional views schematically showing a fuel cell 100b according to the third embodiment. The section of the fuel cell 100b as shown in FIG. 8A and FIG. 8B is taken at a position corresponding with the position at which the section of the fuel cell 100 as shown in FIG. 1A and FIG. 1B is taken in the first embodiment. Namely, the section of the fuel cell 100b as shown in FIG. 8A is taken along line 1-1 in FIG. 3. In the fuel cell 100b of this embodiment, the construction of a unit cell 200b is different from that of the unit cell 200 in the fuel cell 100 of the first embodiment. The other features of the fuel cell 100b are similar to those of the fuel cell 100 of the first embodiment.

The unit cell 200b of the fuel cell 100b according to the third embodiment consists principally of a power generating body 210b, and anode-side second diffusion layer 216b and cathode-side second diffusion layer 217b disposed on the opposite sides of the power generating body 210b so as to sandwich the power generating body 210b therebetween, as shown in FIG. 8A. The power generating body 210b consists principally of an electrolyte layer 212, and anode-side catalyst electrode layer 214b and cathode-side catalyst electrode layer 215b disposed on the opposite sides of the electrolyte layer 212 so as to sandwich the electrolyte layer 212 therebetween, as shown in FIG. 8B. The fuel cell 100b of this embodiment is not provided with the anode-side first diffusion layer 220 and cathode-side first diffusion layer 230 provided in the fuel cell 100 of the first embodiment as shown in FIGS. 1A and 1B and FIGS. 2A and 2B.

In the fuel cell 100b of the third embodiment, too, the first seal 510 is provided around the power generating body 210b, as in the fuel cell 100 of the first embodiment. Also, the second seals 520 are respectively provided around the anode-side second diffusion layer 216b and the cathode-side second diffusion layer 217b. The method of manufacturing the fuel cell 100b according to the third embodiment is substantially identical with the method of manufacturing the fuel cell 100 according to the first embodiment as shown in FIGS. 5A and 5B, except that the construction of the power generating body 210b is different from that of the power generating body 210, and that the second seals 520 are formed on the second diffusion layers, rather than the first diffusion layers.

In the third embodiment, the second seals 520, more specifically, their portions located outside the end faces of the anode-side second diffusion layer 216b and cathode-side second diffusion layer 217b, are in intimate contact the lamination surfaces of the corresponding separators 300, and are in intimate contact with the power generating body 210b so as to cover the entire regions of the exposed lamination surfaces of the power generating body 210b which are not covered with the covering portions 514 of the first seal 510. With this arrangement, leakage of reaction gas into the diffusion-layer surrounding space SS can be suppressed, and an otherwise possible reduction in the power generating efficiency can be suppressed, as in the first embodiment.

It is to be understood that the invention is not limited to details of the illustrated embodiments, but may be embodied in various other forms, without departing from the principle of the invention. For example, the illustrated embodiments may be modified as described below.

Figure 9:
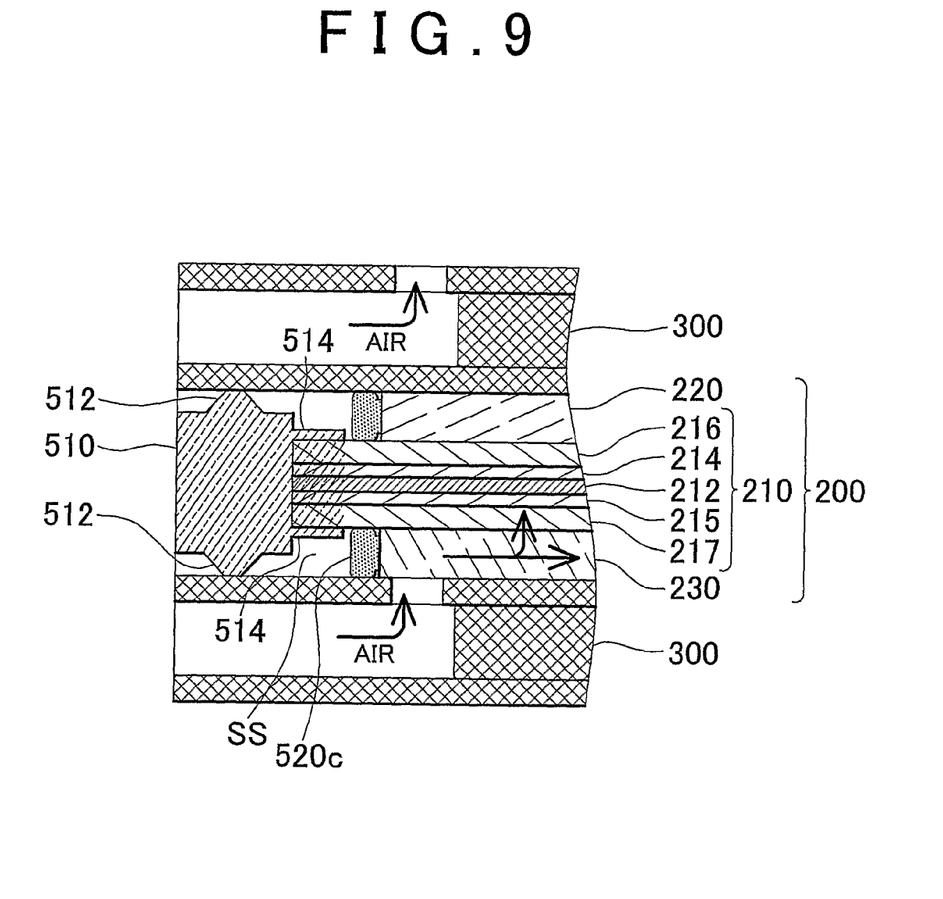
FIG. 9 is a cross sectional view schematically showing a fuel cell as a modified example.

While the construction of the second seals 520 has been illustrated by way of example in each of the illustrated embodiments, the second seals 520 may be otherwise constructed. FIG. 9 is a cross-sectional view schematically showing a fuel cell 100 as a modified example. As shown in FIG. 9, second seals 520c of the fuel cell 100 as the modified example are in intimate contact with the lamination surfaces of the separators 300 and with the lamination surfaces of the power generating body 210, so that leakage of reaction gas into the diffusion-layer surrounding space SS can be suppressed, as in each of the illustrated embodiments. It is, however, to be noted that the second seals 520c of the fuel cell 100 as the modified example are not arranged to be in intimate contact the entire regions of the exposed lamination surfaces of the power generating body 210 which are not covered with the covering portions 514 of the first seal 510. If the second seals 520 are in intimate contact the entire regions of the exposed lamination surfaces of the power generating body 210 which are not covered with the covering portions 514 as in each of the illustrated embodiments, leakage of reaction gas into the diffusion-layer surrounding space SS via the lamination surfaces of the power generating body 210 can be prevented with higher reliability. It is thus preferable to employ the second seals 520 of the illustrated embodiments.

Also, the second seals 520c of the fuel cell 100 as the modified example are not arranged to cover the entire areas of the end faces of the first diffusion layers 220 and 230, as is the case with the second seals 520 of each of the illustrated embodiments. If the second seals 520 are arranged to cover the entire areas of the end faces of the first diffusion layers 220 and 230, as in each of the illustrated embodiments, leakage of reaction gas into the diffusion-layer surrounding space SS can be prevented with higher reliability. It is thus preferable to employ the second seals 520 of the illustrated embodiments.

While the cross-sectional shape of each of the second seals 520 prior to stacking has been described by way of example in each of the illustrated embodiments, the second seal 520 may have other cross-sectional shapes. For example, the maximum thickness ts of the second seal 520 measured in the stacking direction prior to stacking is not necessarily larger than the thickness tp of the first diffusion layer 220, 230 (or the second diffusion layer 216b, 217b). Even if the thickness ts is equal to or smaller than the thickness tp, the second seal 520 may be brought into intimate contact with the separator 300 and the power generating body 210, depending upon the shape of the separator 300, for example.

Also, the maximum thickness ts of the second seal 520 measured in the stacking direction may be set independently between the anode side and the cathode side. In the case where the first diffusion layers 220 and 230 have different thicknesses, for example, the maximum thickness ts of the second seal 520 on the anode side may be set to a value different from the maximum thickness ts of the second seal 520 on the cathode side.

While each of the separators 300 consists of three metal plates that are laminated together, and its surfaces have a flat shape, in each of the illustrated embodiments, the separator 300 may be otherwise constructed or designed, or may have any other shape. While the separator 300 is formed of a metal in each of the illustrated embodiments, the separator 300 may be formed of other materials, such as carbon.

While the fuel cell 100 is comprised of the unit cells 200 and the separators 300 that are alternately laminated or stacked together in each of the illustrated embodiments, the fuel cell 100 may be comprised of a plurality of units each consisting of a unit cell 200 and separators 300 disposed on the opposite sides of the unit cell 200.

The invention claimed is:

1. A fuel cell, comprising:
a power generating body including an electrolyte layer and electrode layers disposed on opposite major surfaces of the electrolyte layer;
a plurality of diffusion layers disposed on opposite major surfaces of the power generating body, and including internal channels through which a gas used for power generation flows so that the gas is supplied to the power generating body;
a plurality of separators disposed on major surfaces of the diffusion layers opposite to major surfaces thereof facing the power generating body, so as to supply the gas to the diffusion layers, the power generating body, the diffusion layers and the separators being stacked together to form the fuel cell;
a first seal formed around the periphery of the power generating body to extend along an end face of the power generating body and including an effective seal portion that suppresses leakage of the gas to the outside of the fuel cell between the separators; and
a second seal formed integrally with at least one of the diffusion layers to extend along an end face of the at least one diffusion layer, the second seal being in intimate contact with a lamination surface of the power generating body on which the diffusion layer is laminated and a lamination surface of a corresponding one of the separators that is laminated on the diffusion layer, wherein
the first seal includes a covering portion that covers each of opposite lamination surfaces of an end portion of the power generating body on which the diffusion layers are laminated,
the second seal includes a portion that is located outside the end face of the diffusion layer and is in intimate contact with the entire region of the lamination surface of the power generating body which is not covered with the covering portion, the second seal being in intimate contact with a part of the first seal, and
the covering portion overlaps with the second seal in a stacking direction of the fuel cell.

2. A fuel cell according to claim 1, wherein the second seal is formed of a material having lower stiffness than that of the first seal.

3. A fuel cell according to claim 1, wherein the major surface of each of the separators that faces a corresponding one of the diffusion layers has a flat shape.

4. A fuel cell according to claim 1, wherein the first seal covers an entire area of end faces of the electrolyte layer and the electrode layers.

5. A fuel cell according to claim 1, wherein the second seal covers an entire area of the end face of the diffusion layer.

* * * * *